(12) United States Patent
Govari et al.

(10) Patent No.: US 12,471,987 B2
(45) Date of Patent: Nov. 18, 2025

(54) PRESENTING QUALITY MEASURES OF TISSUE ABLATION IN A BLOOD VESSEL USING A TWO-DIMENSIONAL MAP

(71) Applicant: BIOSENSE WEBSTER (ISRAEL) LTD., Yokneam (IL)

(72) Inventors: Assaf Govari, Haifa (IL); Andres Claudio Altmann, Haifa (IL); Vadim Gliner, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 99 days.

(21) Appl. No.: 17/400,432

(22) Filed: Aug. 12, 2021

(65) Prior Publication Data

US 2023/0050590 A1    Feb. 16, 2023

(51) Int. Cl.
| | | |
|---|---|---|
| *A61B 18/00* | (2006.01) |
| *A61B 18/14* | (2006.01) |
| *A61B 90/00* | (2016.01) |
| *A61B 5/00* | (2006.01) |

(52) U.S. Cl.
CPC .......... *A61B 18/1492* (2013.01); *A61B 90/36* (2016.02); *A61B 5/4848* (2013.01); *A61B 2018/00375* (2013.01); *A61B 2018/00642* (2013.01); *A61B 2018/00839* (2013.01)

(58) Field of Classification Search
CPC ..... A61B 18/1492; A61B 5/367; A61B 5/339; A61B 5/343; A61B 2018/00839; A61B 2018/00375; A61B 5/4848
See application file for complete search history.

(56) References Cited

U.S. PATENT DOCUMENTS

| | | |
|---|---|---|
| 5,391,199 A | 2/1995 | Ben-Haim |
| 6,239,724 B1 | 5/2001 | Doron et al. |
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |
| 2002/0065455 A1 | 5/2002 | Ben-Haim et al. |
| 2003/0120150 A1 | 6/2003 | Govari |
| 2004/0068178 A1 | 4/2004 | Govari |
| 2004/0147920 A1* | 7/2004 | Keidar .................. A61B 90/92 606/41 |

(Continued)

FOREIGN PATENT DOCUMENTS

| | | |
|---|---|---|
| EP | 3791819 A1 | 3/2021 |
| WO | WO9605768 | 2/1996 |

(Continued)

OTHER PUBLICATIONS

Extended European Search Report dated Jan. 13, 2023, from corresponding European Application No. 22189865.3.

(Continued)

*Primary Examiner* — Jaymi E Della

(57) ABSTRACT

A method includes, receiving multiple signals from multiple respective electrodes arranged along an inner circumference of a blood vessel that has been ablated. Based on the multiple signals, one or more quality measures of the ablated blood vessel are produced. A graphical presentation indicative of the one or more quality measures, is displayed to a user in a two-dimensional (2D) polar coordinate system.

18 Claims, 2 Drawing Sheets

(56) References Cited

U.S. PATENT DOCUMENTS

| | | | |
|---|---|---|---|
| 2005/0209589 A1* | 9/2005 | Berman | A61B 18/22 |
| | | | 606/41 |
| 2009/0177111 A1* | 7/2009 | Miller | A61B 5/6885 |
| | | | 600/587 |
| 2014/0081262 A1* | 3/2014 | Koblish | A61B 18/1492 |
| | | | 606/41 |
| 2016/0235303 A1* | 8/2016 | Fleming | A61B 5/1459 |
| 2018/0177467 A1* | 6/2018 | Katz | A61B 5/0084 |
| 2020/0022653 A1* | 1/2020 | Moisa | A61N 1/36514 |
| 2020/0197095 A1 | 6/2020 | Harlev et al. | |
| 2021/0045834 A1 | 2/2021 | Ransbury et al. | |

FOREIGN PATENT DOCUMENTS

| | | |
|---|---|---|
| WO | 2019116175 A1 | 6/2019 |
| WO | 2019140451 A1 | 7/2019 |
| WO | WO2020/154543 | 7/2020 |
| WO | 2021001338 A1 | 1/2021 |
| WO | WO2020/001338 | 1/2021 |

OTHER PUBLICATIONS

Exam Report dated Sep. 19, 2024, from corresponding European Application No. 22189865.3.

* cited by examiner

FIG. 2A

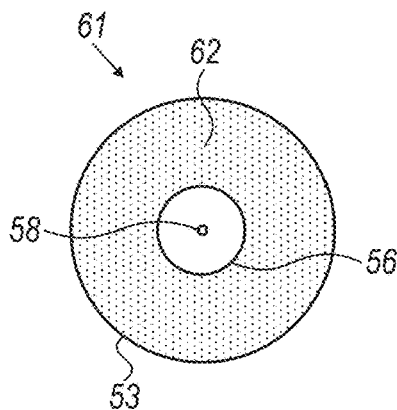

FIG. 2B

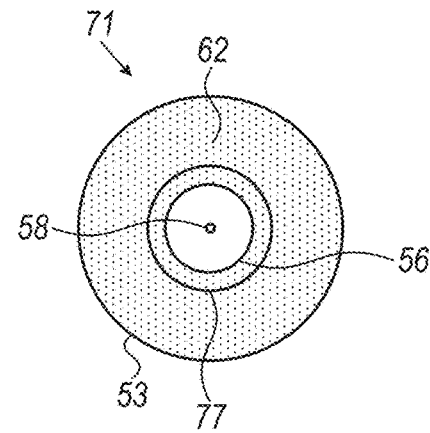

FIG. 2C

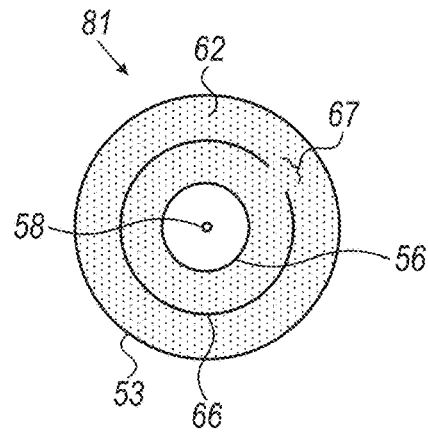

FIG. 2D

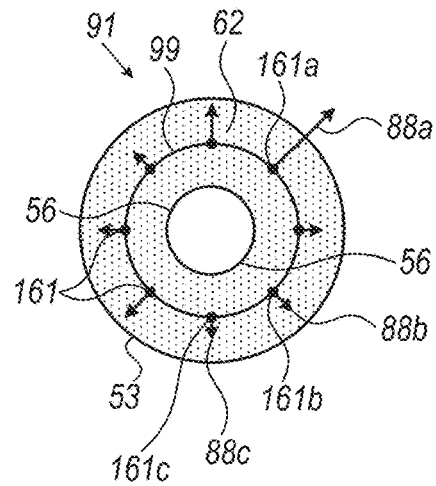

FIG. 3

| Receive multiple signals from multiple respective electrodes arranged along an inner circumference of a blood vessel that has been ablated | 100 |
|---|---|

↓

| Produce, based on the multiple signals, one or more quality measures of the ablated blood vessel | 102 |
|---|---|

↓

| Display to a user, a graphical presentation indicative of the quality measures, in a two-dimensional (2D) polar coordinate system | 104 |
|---|---|

PRESENTING QUALITY MEASURES OF TISSUE ABLATION IN A BLOOD VESSEL USING A TWO-DIMENSIONAL MAP

FIELD OF THE INVENTION

The present invention relates generally to graphical user interface (GUI) in medical systems, and particularly to methods and systems for presenting quality measures of tissue ablation in a blood vessel using Two-dimensional map.

BACKGROUND OF THE INVENTION

Various techniques for presenting tissue ablation, such as pulmonary vein (PV) isolation, have been published.

For example, PCT international publication WO 2021/001338 describes systems, devices, and methods for guiding an ablation procedure. For example, in one embodiment, a system for guiding ablation includes a processor circuit in communication an electrophysiology (EP) catheter comprising a plurality of electrodes. The EP catheter is positioned near an ablation balloon during placement at the ablation site, and is used to detect blood flow within a cavity of the heart by detecting electrical signals relating to dielectric properties. It can then be determined whether any gaps are present at the interface between the balloon and the ablation site. For example, the processor circuit can determine, based on the detected blood flow, whether a balloon occludes a region of interest. The processor then outputs a visualization indicating whether the balloon occludes the region of interest to a display.

PCT international publication WO 2020/154543 describes systems, devices, and methods for generating therapy annotations for display on a graphical user interface. In some embodiments, therapy annotations can correspond to a location of a tip section of a catheter relative to an anatomical structure of a patient when therapy is delivered to the anatomical structure. One or more properties of the therapy annotations can be based at least in part on signals received from sensors distributed about the tip section of the catheter and/or on other characteristics of therapy delivery. The therapy annotations can be displayed alone or in combination with a three-dimensional surface representation of the anatomical structure, a representation of the catheter, and/or other visual indicia, such as a therapy contour, a distance from a nearest therapy site and/or the most recent therapy site, and/or a representation of gaps between two therapy sites.

SUMMARY OF THE INVENTION

An embodiment of the present invention that is described herein provides a method, including receiving multiple signals from multiple respective electrodes arranged along an inner circumference of a blood vessel that has been ablated. Based on the multiple signals, one or more quality measures of the ablated blood vessel are produced. A graphical presentation indicative of the one or more quality measures, is displayed to a user in a two-dimensional (2D) polar coordinate system.

In some embodiments, a position of the multiple electrodes is selected by the user along a longitudinal axis of the blood vessel, and displaying the graphical presentation includes displaying at least a portion of a circle having a radius indicative of the selected position of the inner circumference along the longitudinal axis. In other embodiments, the radius is indicative of a distance of the selected position of the multiple electrodes from an ostium of the blood vessel. In yet other embodiments, the ablation produces a lesion along the inner circumference, and displaying the graphical presentation includes displaying at least the portion of the circle at a section of the inner circumference in which the lesion has been produced.

In an embodiment, in response to identifying an additional section of the inner circumference in which the lesion has not been produced, displaying the graphical presentation includes displaying an opening in the circle, which is indicative of the position of the additional section. In another embodiment, the blood vessel includes a pulmonary vein (PV) that transfers blood between a heart and lungs of a patient, and the signals are indicative of a wave propagating through or along at least a portion of tissue of the PV.

In some embodiments, the one or more quality measures include multiple amplitudes of the multiple signals, respectively, and displaying the graphical presentation includes displaying at least a vector indicative of the amplitude of at least one of the multiple signals. In other embodiments, the coordinate system has an origin, and displaying the graphical representation includes displaying a graphical object at a distance from the origin, which is indicative of a position of one of the electrodes on the inner circumference and along a longitudinal axis of the blood vessel.

There is additionally provided, in accordance with an embodiment of the present invention, a system including a processor and a display. The processor is configured to: (i) receive multiple signals from multiple respective electrodes arranged along an inner circumference of a blood vessel that has been ablated, (ii) produce, based on the multiple signals, one or more quality measures of the ablated blood vessel, and (iii) produce a graphical presentation indicative of the one or more quality measures, in a two-dimensional (2D) polar coordinate system. The display is configured to display the graphical presentation to a user.

The present invention will be more fully understood from the following detailed description of the embodiments thereof, taken together with the drawings in which:

BRIEF DESCRIPTION OF THE DRAWINGS

FIGS. 2A-2D are schematic, pictorial illustrations of quality measures that are presented over a graphical representation of an ablated pulmonary vein (PV), in accordance with embodiments of the present invention; and FIG. 3 is a flow chart that schematically illustrate a method for displaying a graphical presentation indicative of one or more quality measures of an ablated PV, in accordance with an embodiment of the present invention.

DETAILED DESCRIPTION OF EMBODIMENTS

Overview

Figure 1:
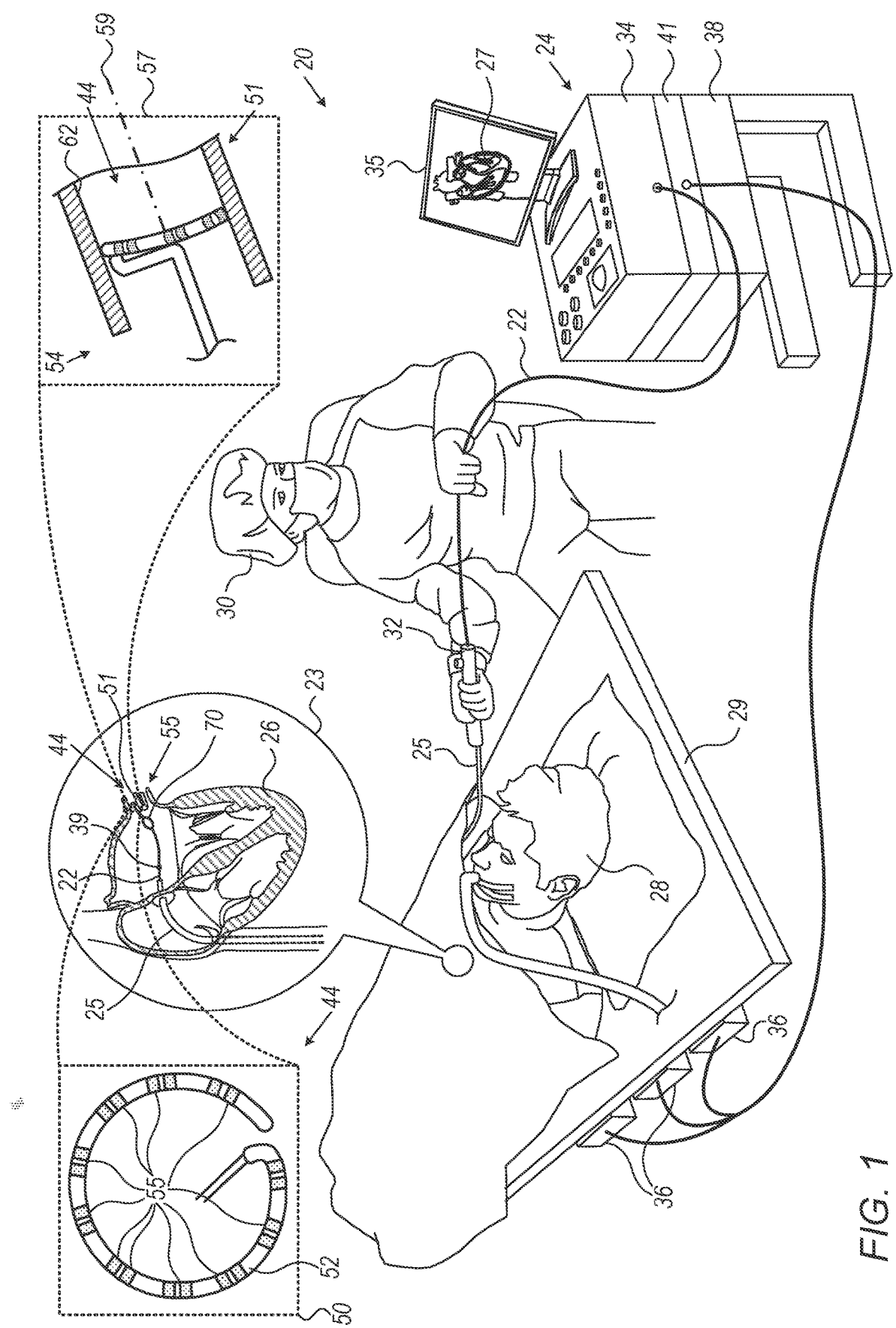
FIG. 1 is a schematic, pictorial illustration of a catheter-based tracking and ablation system, in accordance with an embodiment of the present invention.

Ablation procedures typically aim to produce a lesion at a predefined location in tissue of a patient organ, so as to block the propagation of an electrophysiological (EP) wave, e.g., across the organ. After ablating the tissue, it is important to verify that the lesion is continuous, has the desired size, and blocks the EP wave.

When ablating a tubular tissue, such as a pulmonary vein (PV) or another blood vessel connected to a patient heart, the verification of the lesion properties and effectiveness is difficult. Specifically, a PV isolation procedure is intended to produce a continuous lesion having a ring shape along the inner circumference of the PV, so as to prevent or minimize arrhythmias, such as atrial fibrillation, in the patient heart. Therefore, the verification of the lesion properties and effectiveness in PV isolation is very important to the patient safety.

Embodiments of the present invention that are described hereinbelow provide improved techniques for presenting, over a two-dimensional (2D) map, quality measures of tissue ablation in a blood vessel, such as a PV. The quality measures are indicative of the size, shape and continuity of the lesion, and of the ability of the lesion to block the propagation of the EP wave along the walls of the PV.

In some embodiments, a system for performing tissue ablation comprises a catheter having one or more expandable distal end assemblies (DEAs). In the present example, the catheter comprises: (i) an inflatable balloon DEA, having ablation electrodes arranged on the outer surface of the balloon and configured to form the lesion when placed in contact with the tissue in question, and (ii) a lasso-shaped DEA, having sensing electrodes arranged along an expandable arm of the lasso-shaped assembly, and when placed in contact with the PV tissue, are configured to sense EP signals indicative of an EP wave propagating through and/or along the walls of the PV. In the present example, the intended lesion has a ring or circular shape, but may have any other shape of a closed loop.

In some embodiments, the system comprises a processor and a display. The processor is configured to: (i) receive multiple signals from multiple respective sensing electrodes of the lasso-shaped DEA, which are arranged along an inner circumference of the PV that has been ablated, (ii) produce, based on the multiple signals, one or more quality measures of the ablated PV, and (iii) produce a graphical presentation indicative of the one or more quality measures, in a two-dimensional (2D) polar coordinate system. In some embodiments, the display is configured to display the graphical presentation to a user of the system (e.g., a physician).

In some embodiments, the position of the sensing electrodes is selected by the user along the longitudinal axis of the PV, and the processor is configured to produce in the graphical presentation at least a portion of a circle having a radius indicative of the selected position of the inner circumference along the longitudinal axis of the PV. Moreover, the radius is indicative of the distance of the selected position of the sensing electrodes from the ostium of the PV.

In some embodiments, in response to identifying a section of the inner circumference in which the lesion has not been formed, the processor is configured to produce in the graphical presentation an opening in the circle, which is indicative of the position of the aforementioned section.

In some embodiments, the quality measures may comprise, inter alia, amplitudes of the sensed signals, and the processor is configured to produce in the graphical presentation a vector indicative of the amplitude of signals at the respective positions of one or more of the sensing electrodes.

The disclosed techniques improve the quality of lesions formed in ablation procedures performed in tubular organs. By improving the graphical presentation of the geometrical features and the quality measures of the lesion, the disclosed techniques assist in obtaining successful ablation procedures, and reducing the time required the ablation verification.

System Description

FIG. 1 is a schematic, pictorial illustration of a catheter-based tracking and ablation system 20, in accordance with an embodiment of the present invention.

In some embodiments, system 20 comprises a catheter 22, in the present example a cardiac catheter, and a control console 24. In the embodiment described herein, catheter 22 may be used for any suitable therapeutic and/or diagnostic purposes, such as but not limited to sensing electrophysiological (EP) signals and performing electro-anatomical (EA) mapping of tissue of a heart 26 and for ablating tissue in question of heart 26, as will be described in detail below.

In some embodiments, console 24 comprises a processor 34, typically a general-purpose computer, with suitable front end and interface circuits for receiving signals via catheter 22 and for controlling the other components of system 20 described herein. Console 24 further comprises a user display 35, which is configured to receive from processor 34 a map 27 of heart 26 and other graphical presentations, and to display map 27 and the graphical presentations.

In some embodiments, map 27 may comprise any suitable type of a two-dimensional (2D) or a three-dimensional (3D) anatomical map produced using any suitable technique. For example, the anatomical map may be produced using an anatomical image produced by using a suitable medical imaging system, or using a fast anatomical mapping (FAM) techniques available in the CARTO™ system, produced by Biosense Webster Inc. (Irvine, Calif.), or using any other suitable technique, or using any suitable combination of the above.

Reference is now made to an inset 23. In some embodiments, prior to performing an ablation procedure, a physician 30 inserts catheter 22 through the vasculature system of a patient 28 lying on a table 29, so as to perform EA mapping of tissue in question of heart 26.

In some embodiments, after performing the tissue ablation, physician 30 places one or more electrodes 55 (described in detail below) of catheter 22 in contact with the tissue in question, so as to produce an EA map of the tissue that has been ablated. Subsequently, physician 30 uses the produced EA map for assessing the ablation impact and the condition of the ablated tissue. These embodiments are described in detail in FIGS. 2 and 3 below.

In some embodiments, catheter 22 comprises a distal-end assembly having a balloon 70 and a lasso-shaped assembly, referred to herein as a lasso 44. In the present example, balloon 70 has ablation electrodes (not shown), which are configured to apply one or more ablation pulses to tissue, and lasso 44, which is fitted distally to balloon 70, has multiple sensing electrodes 55. In the context of the present disclosure and in the claims, the terms "electrodes" and "sensing electrodes" that are referred to electrodes 55 of lasso 44, are used interchangeably. Non-sensing electrodes, are referred to herein as "ablation electrodes" that are coupled to balloon 70, as will be described in detail below.

In some embodiments, in response to sensing EP signals, e.g., electrocardiogram (ECG) signals, in tissue of heart 26, each sensing electrode 55 is configured to produce one or more signals indicative of the sensed EP signals. In the example shown in inset 23, physician 30 inserts the distal-end assembly into a pulmonary vein (PV) 51 that transfers blood between heart 26 and the lungs (not shown) of patient 28. The ablation procedure typically requires at least three steps: (i) a first EA mapping using lasso 44, (ii) tissue ablation using the electrodes of balloon 70, and (iii) a second EA mapping using lasso 44. Both lasso 44 and balloon are expandable and are configured to place one or more of their electrodes in contact with tissue of PV 51. The steps are described in more detail below.

In some embodiments, based on the first EA mapping, physician 30 determines one or more locations intended for performing the tissue ablation. After ablating the tissue, physician 30 performs the second EA mapping for checking whether the ablation has obtained the desired outcome for treating the arrhythmia in patient heart 26.

Reference is now made to an inset 57 showing a side view of PV 51 and lasso 44 inserted along a longitudinal axis 59 of PV 51. Note that balloon 70, which is configured to ablate the tissue of PV 51, and is coupled to catheter 22 proximally to lasso 44, is not shown in inset 57.

In some embodiments, during the ablation procedure physician 30 inserts lasso 44 through an ostium 54 of PV 51, so as to carry out the sensing and tissue ablation activities described above. Physician 30 moves lasso 44 along longitudinal axis 59 and when obtaining the desired position, physician 30 using a manipulator 32 for expanding lasso 44 so as to place one or more electrodes 55 of lasso 44 in contact with the surface of an inner circumference 62 of PV 51.

Reference is now made to an inset 50, which is a top-view of lasso 44. In some embodiments, lasso 44 comprises (i) a flexible arm 52, which is controlled by manipulator 32 and is configured to: (a) expand so as to conform to the surface of inner circumference 62 of PV 51, and (b) collapse so as to move lasso 44 within heart 26 and the vasculature of patient 28, and (ii) multiple electrodes 55 coupled to arm 52 and configured to sense the EP signals (in the present example) and/or to ablate the surface of inner circumference 62 of PV 51. Note that electrodes 55 are configured for sensing the EP signals, and the electrodes (not shown) of balloon 70 are configured for applying ablation pulses to tissue of inner circumference 62 of PV 51.

Reference is now made back to inset 23. In some embodiments, physician 30 inserts catheter 22 through a sheath 25, and uses manipulator 32 for manipulating catheter 22 and for positioning lasso 44 and the distal end of sheath 25 in close proximity to ostium 54 of PV 51. Subsequently, physician 30 uses manipulator 32 to retract sheath 25, so as to expose and move balloon 70 and lasso 44 into a desired position within PV 51. During the first EA mapping, physician 30 applies manipulator 32 for expanding arm 52 so that at least some of electrodes 55 are placed in contact with the surface of inner circumference 62 of PV 51. Note that the positioning of balloon 70 and lasso 44 within PV 51, is carried out using a position tracking system, which is described in detail below.

In some embodiments, after positioning and expanding lasso 44 at the desired position(s) in PV 51, physician 30 performs the first EA mapping before performing the tissue ablation. Note that based on the first EA mapping, processor 34 may produce and display a first EA map on display 35, and based on the first EA map, physician 30 may define the ablation site(s) along inner circumference 62 of PV 51. In the present example, the ablation procedure comprises a PV isolation procedure in which inner circumference 62 tissue of PV 51 is ablated by the electrodes of balloon 70, at a target position defined by physician 30 based on the first EA mapping described above. The PV isolation is intended to form a lesion in the tissue, so as to prevent or minimize (to a level below a threshold) the propagation of EP waves through and/or along the tissue of inner circumference 62 of PV 51.

In other words, the term "PV isolation" refers to blockage of EP waves from propagating through and/or along the walls of PV 51.

In some embodiments, in the second EA mapping, which is carried out after ablating the tissue, physician 30 moves lasso 44 along longitudinal axis 59 and selects one or more positions in which he/she expands lasso 44 for sensing EP signals at the ablation site and typically also at additional positions along PV 51. In the present example, the ablation pulses are applied to tissue of inner circumference 62, located in close proximity to or directly at ostium 54, and the second EA mapping is carried out at multiple positions between ostium 54 and about 2 cm into PV 51, along longitudinal axis 59.

In some embodiments, when performing the second EA mapping, physician 30 checks one or more quality measures of the ablated PV 51. One example quality measure may comprise an amplitude of an EP signal (e.g., voltage) sensed by a respective electrode 55. The sensed EP signal is indicative of either the propagation or blockage of EP waves at the ablated site of PV 51. In other words, the second EA mapping checks whether the ablation obtained the desired electrical isolation of PV 51, so that the measured amplitude may have a very low value (e.g., between zero and about 10 microVolts).

In some embodiments, in case the ablation obtained the desired level of PV isolation, physician 30 retracts lasso 44 out of PV 51, inserts lasso 44 into sheath 25, and concludes the ablation procedure by retracting catheter 22 out of the body of patient 28. In case the amplitude of the sensed EP voltage is larger than a predefined threshold at one or more positions along inner circumference 62, physician 30 may have to conduct an additional ablation session, so as to obtain the desired level of PV isolation, measured by the amplitude of the sensed EP voltage, or by any other suitable measured parameter. After conducting the tissue ablation using balloon 70, physician 30 typically repeats the second EA mapping, so as to confirm that the desired level of PV isolation has been obtained.

Reference is now made back to the general view of FIG. 1. In some embodiments, the proximal end of catheter 22 is connected, inter alia, to interface circuits (not shown), so as to transfer and store the EP sensed signals to a memory 38 of console 24, so that processor 34 can use the stored EP signals for performing the EA mapping. In some embodiments, based on the sensed EP signals, processor 34 is configured to present the 2D or 3D map to physician 30 (e.g., on display 35). Moreover, processor 34 is configured to present on the 2D or 3D map, a graphical indicative of the one or more quality measures described above.

In the context of the present disclosure and in the claims, the terms "about" or "approximately" for any numerical values or ranges indicate a suitable dimensional tolerance that allows the part or collection of components to function for its intended purpose as described herein.

In other embodiments, catheter 22 may have an apparatus other than balloon 70, for ablating tissue at the one or more desired position(s) along inner circumference 62, so as to carry out the aforementioned PV isolation. Additionally or alternatively, physician 30 may use a separate catheter for ablation tissue of PV 51.

In some embodiments, the position of the distal-end assembly in the heart cavity and along PV 51 is measured using a position sensor 39 of a magnetic position tracking system, which may be coupled to the distal-end assembly at any suitable position. In the present example, console 24 comprises a driver circuit 41, which is configured to drive magnetic field generators 36 placed at known positions external to patient 28 lying on table 29, e.g., below the patient's torso. As described above, position sensor 39 is coupled to the distal end, and is configured to generate position signals in response to sensed external magnetic fields from field generators 36. The position signals are indicative of the position the distal end of catheter 22 in the coordinate system of the position tracking system.

This method of position sensing is implemented in various medical applications, for example, in the CARTO™ system, produced by Biosense Webster Inc. (Irvine, Calif.) and is described in detail in U.S. Pat. Nos. 5,391,199, 6,690,963, 6,484,118, 6,239,724, 6,618,612 and 6,332,089, in PCT Patent Publication WO 96/05768, and in U.S. Patent Application Publications 2002/0065455 A1, 2003/0120150 A1 and 2004/0068178 A1, whose disclosures are all incorporated herein by reference.

In some embodiments, the coordinate system of the position tracking system are registered with the coordinate systems of system 20 and map 27, so that processor 34 is configured to display, the position of lasso 44 and/or balloon 70 of the distal-end assembly, over the anatomical or EA map (e.g., map 27).

In some embodiments, processor 34 is assembled in a suitable computer, and typically comprises a general-purpose processor, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

This particular configuration of system 20 is shown by way of example, in order to illustrate certain problems that are addressed by embodiments of the present invention and to demonstrate the application of these embodiments in enhancing the performance of such a system. Embodiments of the present invention, however, are by no means limited to this specific sort of example system, and the principles described herein may similarly be applied to other sorts of medical systems.

In other embodiments, system 20 may have, instead of or in addition to lasso 44 and/or balloon 70, any other suitable sort of one or more catheters, which are configured to carry out the sensing and ablation described above, in PV 51 or in any other sort of a blood vessel or in any other organ or a section of an organ having a tubular shape or any other shape.

Presenting One or More Quality Measures of Ablated PV Tissue Over a 2D Map

FIG. 2A is a schematic, pictorial illustration of a 2D map 61 of PV 51, in accordance with an embodiment of the present invention.

In some embodiments, map 61 comprises a polar coordinate system having an origin 58, which is indicative of longitudinal axis 59 of PV 51. In such embodiments, ostium 54 is represented by a circle 53, and a circle 56 represents a second position located about 2 cm into PV 51 along longitudinal axis 59, as described in FIG. 1 above.

In other embodiments, at least one of circles 53 and 56 may have, instead of a circular-shape, a shape of an ellipse or any other suitable shape.

In some embodiments, the tissue of inner circumference 62 of PV 51 is represented by a gray donut-shaped element defined between circles 53 and 56. Note that the polar coordinate system enables a 2D presentation of the 3D shape of PV 51 in map 61, and the distance from origin 58 is indicative of a position of any element described herein, along longitudinal axis 59 of PV 51.

In the present example, map 61 represents a view from a cavity (e.g., a left atrium) of heart 26, into PV 51, so that circle 53 (representing ostium 54) appears larger than circle 56, which is positioned, along longitudinal axis 59, about 2 cm into PV 51.

FIG. 2B is a schematic, pictorial illustration of a PV isolation status displayed over a 2D map 71 of PV 51, in accordance with an embodiment of the present invention.

In some embodiments, map 71 is based on map 61 of FIG. 2A above, and comprises a circle 77, which is indicative of the isolation level of PV 51, based on the EP signals received from electrodes 55 of lasso 44.

In some embodiments, the position of electrodes 55 is selected by physician 30 (or any other user of system 20) along longitudinal axis 59 of PV 51. In some embodiments, processor 34 is configured to display at least a portion of a circle having a radius indicative of the selected position of electrodes 55 on inner circumference 62 along longitudinal axis 59 of PV 51.

In the example of FIG. 2B, the post-ablation second EA mapping (which is described in detail in FIG. 1 above) is carried out at a distance (along longitudinal axis 59) of about 1.8 cm from ostium 54, and therefore, appears in close proximity to circle 56, e.g., at a distance of about 0.2 cm from circle 56.

In some embodiments, the tissue ablation produces a lesion along inner circumference 62, and processor 34 is configured to produce circle 77, which is indicative of the quality measure related to the lesion formed during the ablation. In some embodiments, the continuity of circle 77 is indicative of the lesion ability to block the propagation of the EP wave propagating through and/or along the tissue of PV 51.

In some embodiments, processor 34 is configured to present at least the portion of the circle at a section of the selected inner circumference 62 in which the lesion has been produced. In the present example, the lesion blocks the EP wave completely or sufficiently, so that circle 77 is complete and continuous (shown in a solid line).

Note that the 2D presentation of map 71 provides physician 30 with an immediate visualization of: (i) the position in which the second EA mapping was carried out, and (ii) whether or not the lesion is continuous and blocks the propagation of the EP wave through and/or along the tissue of PV 51. In other words, the radius and shape of circle 77 provides physician 30 with an indication of the position of sensing electrodes 55 and the isolation level of PV 51.

FIG. 2C is a schematic, pictorial illustration of a PV isolation status displayed over a 2D map 81 of PV 51, in accordance with an embodiment of the present invention.

In some embodiments, map 81 is based on map 61 of FIG. 2A above, and comprises a circle 66, which is indicative of the position of sensing electrodes 55 and the isolation level of PV 51. Moreover, circle 66 is based on the EP signals received from electrodes 55 of lasso 44.

In some embodiments, the radius of circle 66 (from origin 58) has a size between the size of circles 53 and 56. This presentation indicates that electrodes 55 of lasso 44 have been positioned, along longitudinal axis 62, at a distance of about 1 cm from ostium 51.

In some embodiments, in response to identifying a given section of inner circumference 62, in which the lesion has not been produced, processor 34 is configured to produce in the graphical presentation an opening in the circle, which is indicative of the position of the given section. In the example of FIG. 2C, circle 66 has an opening 67, which is indicative of an incomplete or no lesion formation. Therefore, opening 67 is indicative of insufficient blocking of the EP wave propagation through and/or along the tissue of PV 51, or over the surface of inner circumference 62.

In some embodiments, based on the position of opening 67, physician 30 may decide to (i) perform ablation at one or more suitable position(s) on the surface on inner circumference 62 of PV 51, and subsequently, (ii) re-perform the EA mapping described in FIG. 1 as the "second" EA mapping. Physician 30 may apply this in one or more iterations until processor 34 displays a complete and contiguous-shape of circle 66.

In a first implementation, physician 30 may decide to repeat the PV isolation procedure by applying the one or more ablation pulse(s) to the selected electrodes of balloon 70, which are placed in contact with the tissue of inner circumference 62 of PV 51. In a second implementation, physician 30 may repeat the PV isolation procedure by applying the one or more ablation pulse(s) only to one or more selected electrodes of balloon 70, which are in contact with the tissue at position(s) that can form the desired lesion and "close" opening 67. In a third implementation, physician 30 may navigate a focal ablation catheter (not shown) and apply the ablation pulse(s) to one or more suitable positions that will form a complete lesion and "close" opening 67. In the context of the present disclosure, the term "close opening 67" refers to the formation of a complete lesion at the selected circumference of PV 51, so as to obtain the required isolation level of PV 51. In the example of FIG. 2C, after obtaining the PV isolation, processor 34 is configured to display a complete circle in which opening 67 has been closed by a solid line, as shown for example in circle 77 of FIG. 2B above.

In some embodiments, processor 34 may hold a threshold indicative of the voltage level of the amplitude of the EP signals measured by each electrode 55 during the EA mapping procedure. In case the voltage is smaller than the threshold, circle 66 remains in a solid line and contiguous. Similarly, in case the voltage measured by the respective one or more electrode(s) 55 is larger than the threshold, processor 34 may present an opening, such as opening 67, at one or more corresponding sections of circle 66.

FIG. 2D is a schematic, pictorial illustration of a PV isolation status displayed over a 2D map 91 of PV 51, in accordance with another embodiment of the present invention.

In some embodiments, map 91 is based on map 61 of FIG. 2A above, and comprises a circle 99 and points 161, which are indicative of the position of arm 52 and sensing electrodes 55, respectively, on the surface of internal circumference 62 of PV 51.

In some embodiments, processor 34 is configured to produce in the graphical presentation of map 91, at least a vector indicative of the amplitude of at least one of the multiple EP signals. In the present example, processor 34 produces and presents the vectors as arrows 88.

In some embodiments, map 91 comprises one or more arrows 88 whose origin is positioned at points 161, and their sizes are indicative of the amplitude voltage of the EP signals received from the respective electrodes 55. In other words, arrows 88 represent the isolation level of PV 51 at each position of respective electrodes 55. Note that in the example of FIG. 4D, the direction of arrows 88 may or may not represent the direction of the EP wave(s) propagating in the tissue of PV 51, so that the length of each arrow 88 is indicative of the voltage level of the EP signal sensed by the respective electrode 55.

In some embodiments, arrows 88a, 88b and 88c are indicative of the amplitude of the voltage sensed by three electrodes 55 whose positions are represented by points 161a, 161b and 161c, respectively. In such embodiments, physician 30 can see that the voltage amplitude at points 161b and 161c is sufficiently small (i.e., smaller than the predefined threshold described in FIG. 2C above), which is indicative of the formation of the desired lesion, e.g., in close proximity to these positions. Arrow 88a, however, appears to have a size (e.g., length) larger than a predefined length threshold, which is indicative that the amplitude of the measured voltage is higher than the predefined voltage threshold. In other words, the size of arrow 88a indicates that no lesion has been formed in close proximity to point 161a, or that the formed lesion is insufficient for isolating PV 51.

In some embodiments, maps 81 and 91 of FIGS. 2C and 2D, respectively, may be produced by processor 34 based on the same EP signals received during the EA mapping. FIG. 2C shows a binary presentation for each section, e.g., a solid line or an opening, representing good or insufficient isolation, respectively. FIG. 2D, however, shows an indication of the magnitude of the voltage measured by each electrode 55, so that in applying the second ablation pulses, physician 30 may use system 20 to apply different ablation pulses to different respective ablation electrodes of balloon 70, in order to obtain the isolation of PV 51, and yet, prevent over-ablation at sites that already have the required lesion.

In other embodiments, processor 34 may present only some of the aforementioned vectors, e.g., arrows 88. For example, processor 34 may present only arrow 88a, whose length exceeds the threshold, and may not present the other arrows 88, so as to reduce redundant information from map 91.

Maps 61, 71, 81 and 91 of FIGS. 2A, 2B, 2C and 2D, respectively, are provides by way of example and are not limited to the embodiments described above. In other embodiments, processor 34 is configured to produce any other suitable maps having other suitable features indicative of one or more other quality measures of the ablated PV or of any other blood vessel or of another organ of patient 28.

In other embodiments, instead of the solid line of circles 66 and 77, processor 34 may produce a dashed line at one or more sections of these circles, so as to present partial blockage of the EP wave. Moreover, processor 34 may overlay graphical elements so as to present multiple measurements on a single map. For example, processor 34 may present circles 66 and 77 on a single map of PV 51, and may overlay geometrical shapes (e.g., triangles and/or rectangles) indicative of the one or more quality measures of the ablated PV. Furthermore, processor 34 may reverse the order and size of circles 53 and 56.

FIG. 3 is a flow chart that schematically illustrate a method for displaying a graphical presentation indicative of one or more quality measures of ablated PV 51, in accordance with an embodiment of the present invention.

The method begins at a signal receiving step 100, with processor 34 that receives multiple signals from multiple respective electrodes 55 arranged along inner circumference 62 of a blood vessel (e.g., PV 51) that has been ablated, as described in FIG. 1, and in FIGS. 2B-2D above.

At a quality measures production step 102, processor 34 produces, based on the multiple signals, one or more quality measures of the ablated blood vessel, as described in detail in FIGS. 1, and 2B-2D above.

At a displaying step 104 that concludes the method, processor 34 displays to physician 30, e.g., on display 35, a graphical presentation indicative of the quality measures (e.g., amplitude of the voltage sensed by electrodes 55 in contact with tissue of PV 51), in a 2D polar coordinate system, such as in maps 71, 81 and 91 described above in FIGS. 2B, 2C and 2D, respectively.

Although the embodiments described herein mainly address pulmonary vein (PV) isolation procedures carried out by ablating tissue of a PV, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving multiple signals from multiple respective electrodes of a distal end assembly of a catheter, the multiple respective electrodes being arranged along an inner circumference of a blood vessel that has been ablated;
producing, based on the multiple signals, one or more quality measures of the ablated blood vessel;
displaying, to a user, a graphical presentation indicative of the one or more quality measures, in a two-dimensional (2D) polar coordinate system, the graphical presentation comprising:
a first circle or ellipse comprising a first radius, the first circle or ellipse being indicative of the inner circumference at a first position along a longitudinal axis of the blood vessel; and
a second circle or ellipse comprising a second radius, different from the first radius, the second circle or ellipse being indicative of the inner circumference at a second position along the longitudinal axis of the blood vessel; and
ablating, by the distal end assembly, the blood vessel on a basis of the graphical presentation indicative of the one or more quality measures.

2. The method according to claim 1, wherein a position of the multiple electrodes is selected by the user along the longitudinal axis of the blood vessel, and wherein displaying the graphical presentation comprises displaying at least a portion of a third circle comprising a third radius indicative of the selected position of the inner circumference along the longitudinal axis.

3. The method according to claim 2, wherein the first circle or ellipse is representative of an ostium of the blood vessel, and the third radius is indicative of a distance of the selected position of the multiple electrodes from the ostium of the blood vessel.

4. The method according to claim 2, wherein the blood vessel comprises a lesion along the inner circumference, and wherein displaying the graphical presentation comprises displaying at least the portion of the third circle at a section of the inner circumference in which the lesion has been produced.

5. The method according to claim 4, wherein, in response to identifying an additional section of the inner circumference in which the lesion has not been produced, displaying the graphical presentation comprises displaying an opening in the third circle, which is indicative of a position of the additional section.

6. The method according to claim 1, wherein the blood vessel comprises a pulmonary vein (PV) that transfers blood between a heart and lungs of a patient, and wherein the multiple signals are indicative of a wave propagating through or along at least a portion of tissue of the PV.

7. The method according to claim 1, wherein the one or more quality measures comprise multiple amplitudes of the multiple signals, respectively, and wherein displaying the graphical presentation comprises displaying at least a vector indicative of the amplitude of at least one of the multiple signals.

8. The method according to claim 1, wherein the coordinate system comprises an origin which is indicative of the longitudinal axis of the blood vessel, and wherein displaying the graphical presentation comprises displaying a graphical object at a distance from the origin, which is indicative of a position of one of the multiple electrodes on the inner circumference and along the longitudinal axis of the blood vessel.

9. The method of claim 1, wherein the one or more quality measures is indicative of at least one of a size of a lesion of the ablated blood vessel, a shape of the lesion, a continuity of the lesion, or an ability of the lesion to block propagation of an electrophysiological wave.

10. A system, comprising:
a distal end assembly of a catheter, the distal end assembly comprising ablation electrodes;
a processor, which is configured to: (i) receive multiple signals from multiple respective electrodes of the distal end assembly of the catheter, the multiple respective electrodes being arranged along an inner circumference of a blood vessel that has been ablated, (ii) produce, based on the multiple signals, one or more quality measures of the ablated blood vessel, and (iii) produce a graphical presentation indicative of the one or more quality measures, in a two-dimensional (2D) polar coordinate system, the graphical presentation comprising: (i) a first circle or ellipse comprising a first radius, the first circle or ellipse being indicative of the inner circumference at a first position along a longitudinal axis of the blood vessel; and (ii) a second circle or ellipse comprising a second radius, different from the first radius, the second circle or ellipse being indicative of the inner circumference at a second position along the longitudinal axis of the blood vessel; and
a display, which is configured to display the graphical presentation to a user, the ablation electrodes being configured to further ablate the blood vessel on a basis of the graphical presentation indicative of the one or more quality measures.

11. The system according to claim 10, wherein the processor is further configured to receive a selection of a position of the multiple electrodes along the longitudinal axis of the blood vessel, and wherein the processor is further configured to produce in the graphical presentation at least a portion of a third circle comprising a third radius indicative of the selected position of the inner circumference along the longitudinal axis.

12. The system according to claim 11, wherein the third radius of the third circle configured to be produced by the processor is indicative of a distance of the selected position of the multiple electrodes from an ostium of the blood vessel.

13. The system according to claim 11, wherein the processor is further configured to produce at least the portion of the third circle at a section of the inner circumference in which a lesion along the inner circumference has been produced.

14. The system according to claim 13, wherein, in response to identifying an additional section of the inner circumference in which the lesion has not been produced, the processor is further configured to display an opening in the third circle which is indicative of a position of the additional section.

15. The system according to claim 10, wherein the multiple signals configured to be received by the processor are indicative of a wave propagating through or along at least a portion of tissue of a pulmonary vein (PV) that transfers blood between a heart and lungs of a patient.

16. The system according to claim 10, wherein the one or more quality measures configured to be produced by the processor comprise multiple amplitudes of the multiple signals, respectively, and wherein the processor is configured to produce in the graphical presentation at least a vector indicative of the amplitude of at least one of the multiple signals.

17. The system according to claim 10, wherein the coordinate system comprises an origin which is indicative of the longitudinal axis of the blood vessel, and wherein the processor is configured to produce in the graphical presentation a graphical object at a distance from the origin which is indicative of a position of one of the multiple electrodes on the inner circumference and along the longitudinal axis of the blood vessel.

18. The system of claim 10, wherein the one or more quality measures configured to be produced by the processor is indicative of at least one of a size of a lesion of the ablated blood vessel, a shape of the lesion, a continuity of the lesion, or an ability of the lesion to block propagation of an electrophysiological wave.

* * * * *